United States Patent [19]
Pisani

[11] 4,387,779
[45] Jun. 14, 1983

[54] SIDEBOOM CRAWLER SUSPENSION

[75] Inventor: Marino J. Pisani, North Riverside, Ill.

[73] Assignee: Dresser Industries, Inc., Dallas, Tex.

[21] Appl. No.: 280,951

[22] PCT Filed: Mar. 30, 1981

[86] PCT No.: PCT/US81/00409
  § 371 Date: Mar. 30, 1981
  § 102(e) Date: Mar. 30, 1981

[87] PCT Pub. No.: WO82/03363
  PCT Pub. Date: Oct. 14, 1982

[51] Int. Cl.³ .............................................. B62D 55/06
[52] U.S. Cl. ..................................................... 180/9.5
[58] Field of Search ................... 180/9.2 R, 9.5, 9.54, 180/9.56, 9.6, 9.62, 9.64; 212/258, 195, 196

[56] References Cited
U.S. PATENT DOCUMENTS

| | | | |
|---|---|---|---|
| 1,429,473 | 9/1922 | Wickersham | 180/9.56 |
| 1,618,203 | 2/1927 | Jett | 180/9.5 X |
| 2,425,663 | 8/1947 | Wooldridge | 212/258 |
| 2,453,360 | 11/1948 | Burks | 180/9.62 |
| 2,712,873 | 7/1955 | Peterson | 212/258 |
| 2,885,092 | 5/1959 | Murrey | 212/258 |
| 3,005,559 | 10/1961 | Toderick | 212/258 X |
| 3,236,391 | 2/1966 | Kennedy | 212/196 |
| 3,329,283 | 7/1967 | Wade | 212/258 X |
| 3,426,915 | 2/1969 | Tesch | 212/188 |
| 3,785,503 | 1/1974 | Butterfield | 212/164 |
| 3,938,669 | 2/1976 | Vinton | 212/146 |
| 3,980,149 | 9/1976 | Blomstrom et al. | 180/9.5 |
| 3,990,583 | 11/1976 | Nishida et al. | 212/258 |
| 4,083,459 | 4/1978 | Allen | 212/196 |
| 4,086,974 | 5/1978 | Leclerc | 180/9.5 |

Primary Examiner—John A. Pekar
Attorney, Agent, or Firm—B. E. Deutsch

[57] ABSTRACT

A sideboom crawler suspension in which the track roller frames disposed at either side of the crawler are braced by a special linkage provided at each side to keep the track roller frame at that side from twisting out of a vertical plane. The frame-twisting or tilting force exerted in the suspension intensifies when the sideboom crawler is doing sidehill work.

8 Claims, 5 Drawing Figures

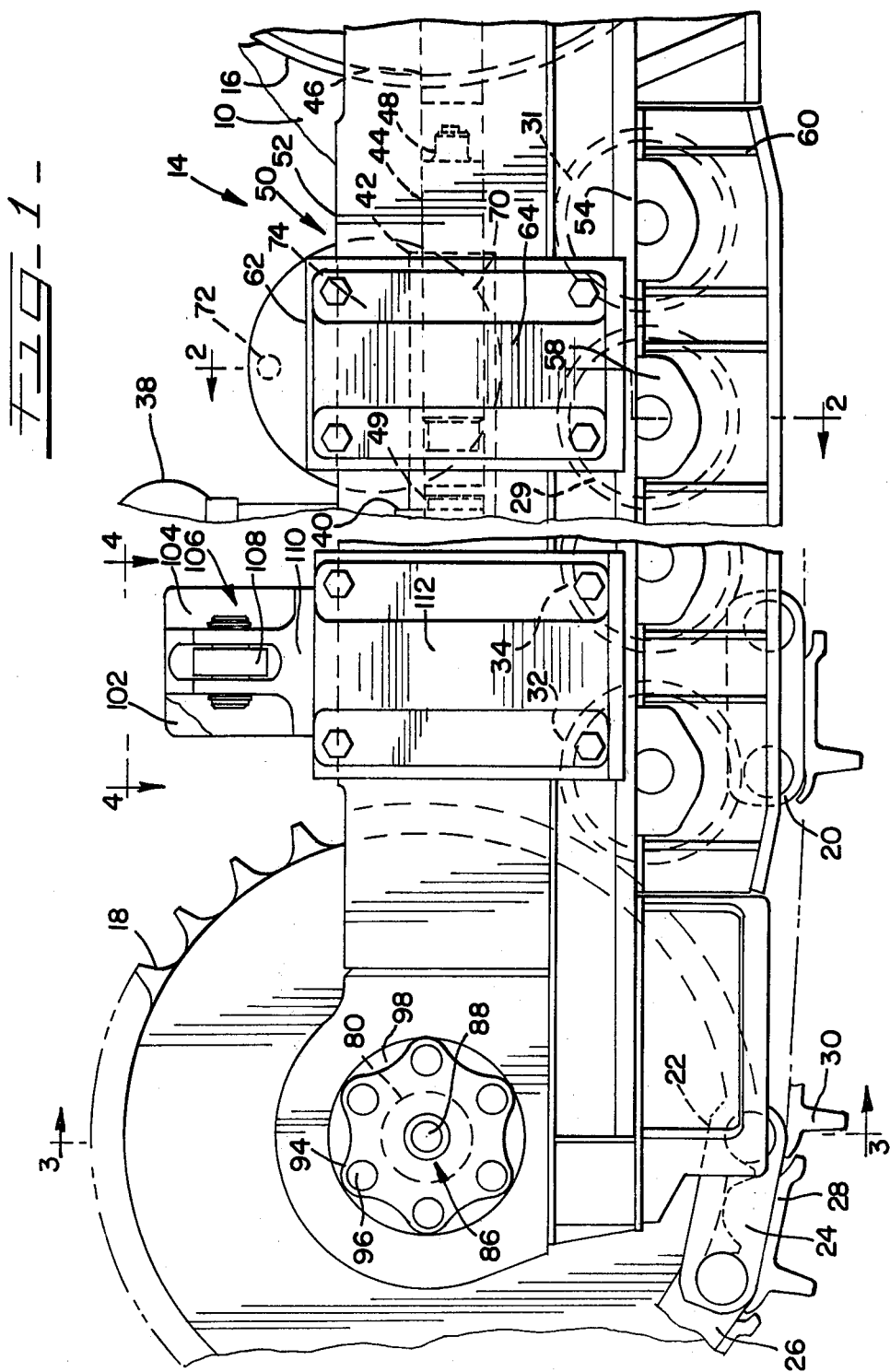

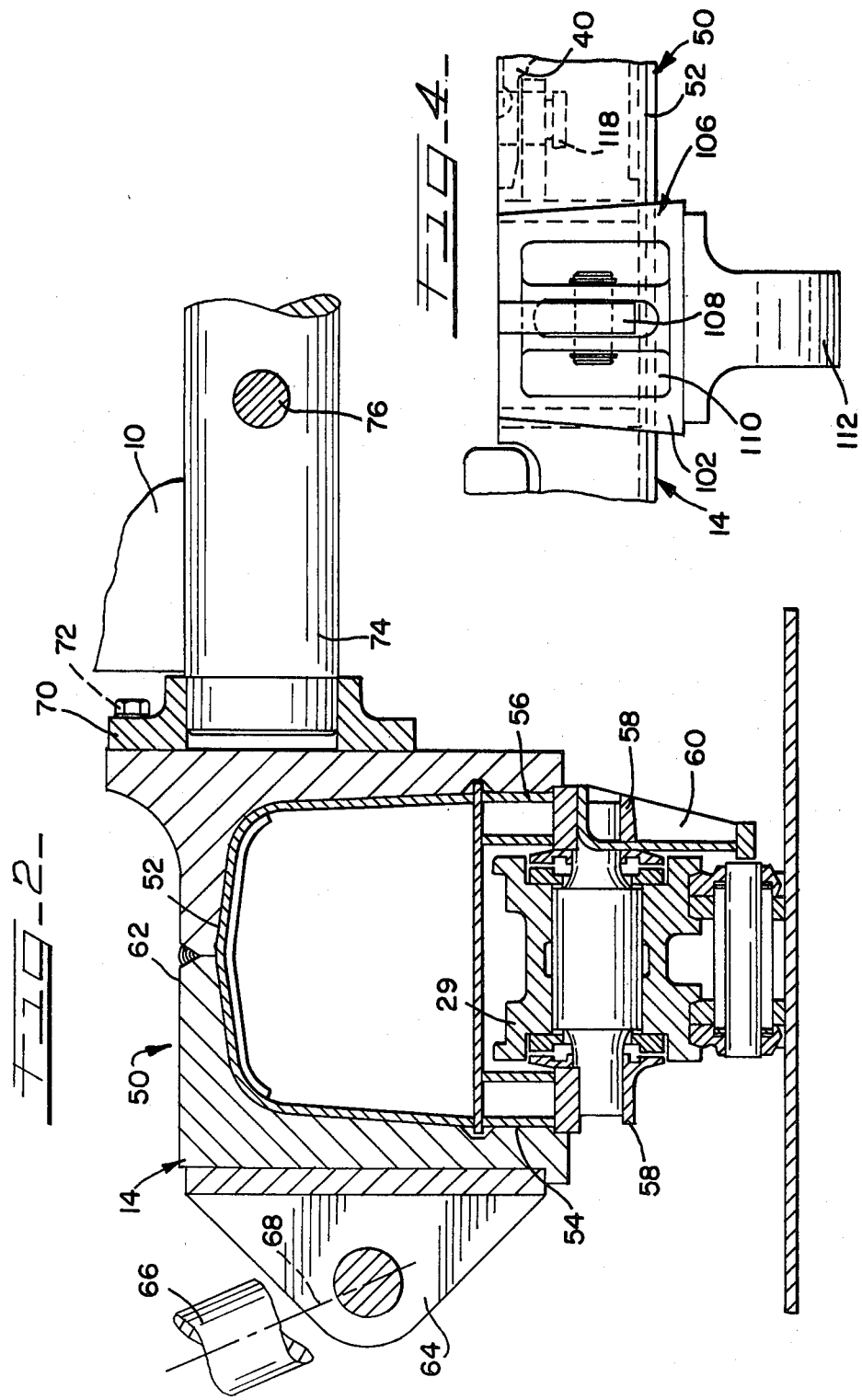

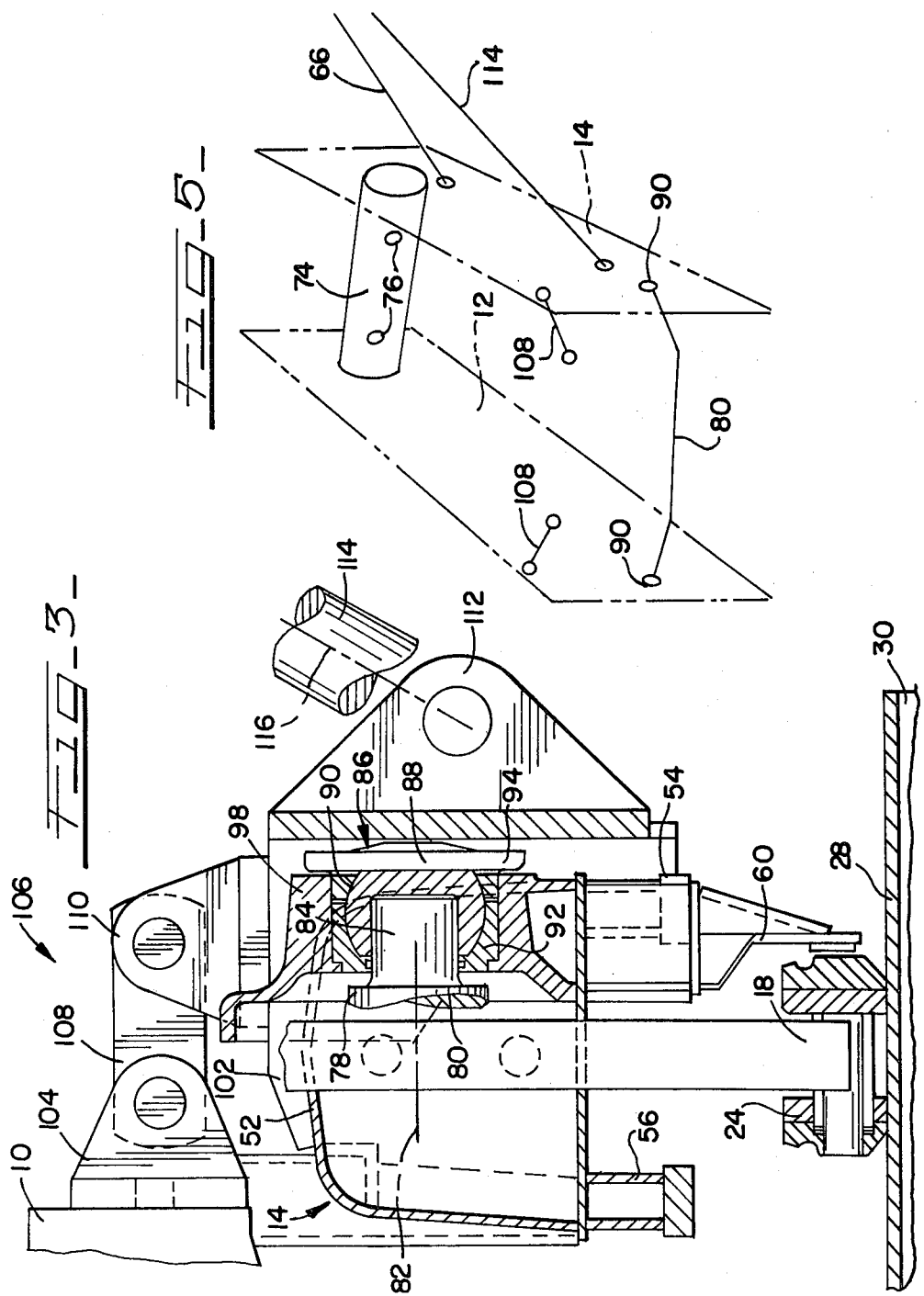

SIDEBOOM CRAWLER SUSPENSION

This application relates to a sideboom crawler suspension, and more particularly to vertically standing track roller frames disposed at either side of the crawler and braced by a special linkage provided at each side to keep the track roller frame at that side from twisting from its vertical plane. The frame-twisting or tilting force exerted in the suspension intensifies when the sideboom crawler is doing sidehill work, especially when the track assembly on either frame encounters the berm, and the torsion is accentuated in any case because the force of the boom on the side of the crawler is designed to be reacted directly into the track frame at that side. The torsion, if left to go unopposed, will act as a force couple rotating one end of a track frame in a transverse plane so as to change position at different times and undesirably grow close to and draw away from an adjacent main chassis frame provided on the crawler.

My vehicle has utility of the type generally as borne out by a usage taught in the U.S. Class 212 particularly adapted for side loader boom attachments. Patents in that class relevant to the particular adaptation as stated include expired U.S. Pat. Nos. 2,425,663; 2,712,873; 2,885,092; 3,005,559; and unexpired U.S. Pat. Nos. 3,236,391; 3,329,283; 3,426,915; 3,785,503; 3,938,669; 3,990,583; and 4,083,459. The descriptions of such an attachment in all of those patent disclosures, and in each one, are incorporated by reference in entirety herein. The usage referred to, generally but not necessarily, is as a pipelayer as the most common type.

My vehicle in terms of undercarriage is of the type generally as borne out by a crawler suspension as taught in the U.S. Class 180 adapted for having its track support mounted for vertical movement. Patents in that class relevant to the particular adaptation as stated include expired U.S. Pat. No. 1,429,473 and unexpired U.S. Pat. No. 3,980,149. The descriptions of such a suspension in all of those patent disclosures, and in each one, are incorporated by reference in entirety herein.

In the crawler here concerned, equipped at the sides with the described track roller frames, I provide three-point contact with the frame at each side as basis for ensuring the single plane frame stability sought. The diagonal braces, conventionally applied, are here altogether eliminated. Instead first, the crawler carries a crossbar common to the track frames and made rigid with them at the forward end. Second, the crawler carries pivot shaft halves provided one to each one of the frames and making a lower mounting connection with them at their rear end portion. Third, a brace linkage between and secured to the crawler and each frame makes an upper mounting connection with the latter frames at their rear end portion. Each frame at its lower connection has a stress relieved mounting I provide for it on the end of the shaft, so that the latter can in effect pivot at its end for the total amount, however slight, called for due to the limited vertical deflections occurring in the shaft as the crawler travels. Also, each frame at its upper connection is afforded a stress relieved mounting to the crawler by the brace linkage on which I provide pivots at both ends, so as to pivot simultaneously relative to the crawler and track frame in accommodating to the vertical shaft deflections, however slight.

So each track frame, free from residual torsional stresses being imparted thereto by the relatively upwardly disposed stress relieved brace linkages or the lower disposed stress relieved pivot shaft, is in effect guided by a complete parallelogram linkage resisting torsional twist in the rear end portion and forcing it to maintain the vertical disposition desired. That is to say, the stress relief in the vertically spaced apart frame connections at the rear makes each mounting self-aligning to the geometry of the parallelogram.

Further features, objects, and advantages will either be particularly pointed out or become apparent when, for a better understanding of my invention, reference is made to the following description taken in conjunction with the accompanying drawings which show a preferred embodiment thereof and in which:

FIG. 1 is in elevation taken of the right side of a sideboom crawler so as to show in face view essential portions of a track frame suspension embodying the present invention;

FIG. 2 is a fragmentary cross sectional view in elevation taken of the front end of the crawler along the section line II—II of FIG. 1;

FIG. 3 is in rear elevation, sectionalized, taken along the section line III—III of FIG. 1;

FIG. 4 is in top plan, being fragmentary and taken in the direction of the section arrows IV—IV in FIG. 1; and FIG. 5 is a schematic isometric, three-quarters view from the top to show the suspension with the body of the crawler omitted.

The sideboom crawler tractor which is in part illustrated in the drawings is of the type having the usual pair of endless-track roller frames disposed on either side thereof for the ground support. Inasmuch as the frames are substantially identical, only one will be described in some detail hereinafter.

More particularly in FIG. 1, the crawler as manifested by its main frame 10, has a left track frame 12, not shown, and a right track frame generally indicated at 14. The track frame 14 carries a fork-journalled front idler wheel 16 and, at the rear, carries a shaft-journalled drive sprocket wheel 18. The two wheels carry, trained thereover, the usual endless track assembly composed of a chain of pivoted together track links 20, 22, 24 and 26 each carrying a track shoe 28 formed with a ground gripping grouser 30 thereon. Only the lower flight is shown.

The frame 14 carries a series of track rollers 32 and 34 journalled on fixed axes for rolling along the essentially continuous track rail presented by the succession of track chain links at the top such as the top of the link 20. The track chain assembly has an upper flight, not shown, which is constrained to circulate over a series of top idler rollers such as the front top roller 38.

A pivotally anchored recoil mechanism strut 40 includes in an intermediate section thereof a recoil cylinder 42 slideably receiving therein a front idler shaft 44. The shaft 44 at the forward end mounts a front idler fork 46 having the base thereof secured by a socket connection 48 to the shaft 44.

At the rear, the shaft 44 carries a sealed plunger portion 49 which is hydraulically preloaded in the cylinder 42 to allow escape of oil trapped in the cylinder between the plunger portion and cylinder under predetermined pressure conditions to accommodate rearward recoil of the idler wheel 16 carried by the fork 46.

In FIGS. 1 and 2, the track frame includes a so-called doghouse 50 fabricated to provide a longitudinally extending, metal, reinforced tunnel 52 and a pair therebeneath of longitudinally extending, supporting side rails 54 and 56 to which each track roller such as the roller 29 (FIG. 2) is rotatably secured therebelow by a pair of roller axle brackets 58.

Dirt shields 60 depend one from the outside rail 54 (FIGS. 1 and 3) and one from the inside rail 56 (FIG. 2).

In FIGS. 1 and 2, a heavy narrow U-shaped, two-piece casting 62 is complementarily secured fast to the outside of the longitudinal tunnel 52 and, at the outside, carries a welded on pivot bracket 64. An A-frame front leg 66 included in the boom of a side crane is pin connected at its foot to the pivot bracket 64 and in known way reacts its compressive load diagonally downwardly into the track frame along the boom axis 68.

FRONT CROSSBAR CONNECTION TO TRACK FRAMES FIGS.—1, 2

The welded together two-piece casting 62 shown in these figures is faced off along its inner vertical portion and receives a crossbar attachment flange 70 secured to the faced off portion by a ring of apporximately sixteen mounting bolts 72. The flange 70 presents a central cylindrical socket receiving the welded in end of a solid cylindrical crossbar 74 and the crawler frame 10 supports its full weight at the front on the crossbar 74. A pin 76 located in the crossbar adjacent the flange 70 firmly secures together the frame 10 and the crossbar at the end of the latter as illustrated and, at the other end unillustrated, the crossbar 74 has a similar pin connection to the frame 10 and a similar attachment flange connection to the track frame 12, not shown, at that end.

It can be seen that the main frame 10 and track frames 12 and 14 are thus made torsionally rigid with one another at the front besides being rigid against toe-in and toe-out movement and other horizontal movement and also up and down movement.

REAR SHAFT CONNECTION TO TRACK FRAMES—FIGS. 1, 3

The shaft-journalled drive sprocket wheel 18 is antifrictionally mounted in conventional way for rotation on the fragmentarially shown, cantilevered journal end section 78 of what can be a one-piece pivot shaft 80, the body of which and the axis 82 of which extend across the rear of the tractor frame 10 in sole supporting relation thereto. The end of the shaft 80 forms a stub axle 84 of reduced diameter on which the rear end portion of the right track roller frame 14 is mounted by means of a self-aligning spherical bearing assembly 86 lubricatable under pressure from the outside through a grease opening 88. In practice, pivot shaft halves are generally used, that is, a shaft divided into halves provided as described, one to each track frame. Asserting the advantage of free license of expression somewhat at the expense of literalism, what I shall now term the pivot shaft is not what pivots, and it is actually only a shaft half opposite to another half.

The bearing assembly comprises at the core a ball 90 centrally socketed so as to receive and solidly be affixed on the stub axle 84 (FIG. 3) of the pivot shaft 80. The inner one 92 of bearing shoe halves spherically complementarily receives the ball 90 thereby preventing axial outward movement of the track frame but affording typical ball joint freedom. A flanged outer one 94 of the complementary shoe halves completes the shoe for the ball joint action and prevents axially inward movement of the track frame relative to the shaft 80. The flange of the outer half 94 has suitable recesses as at 96 formed in radiating arms thereof for receiving bolts so that their heads are recessed in the flange; the bolts, not shown, securely attach the flange to the confronting sprocket housing 98, providing a sealed relubricatable joint. In FIG. 3, the final drive housing is fragmentarily shown at 100 in conjunction with the showing of the sprocket 18 and contains therein the drive gearing for rotating the drive sprocket 18 on the shaft 80.

The shaft 80 has the same construction of a cantilevered journal end section and stub axle at the opposite end for its utility with the mechanism of the track frame 12, not shown, at that end. The intervening ball joint imparts freedom to the frame 12 during installation to align itself in an infinity of limited amounts of rotation about the bearing in yaw, in pitch, and in roll.

BRACE LINKAGE CONNECTION TO TRACK FRAMES—FIGS. 1, 3, 4

Just ahead of the sprocket 18 in each track frame, a heavy L-shaped casting 102 appearing in these figures is made fast by welding to the frame's longitudinal tunnel 52 at the top thereof. Cantilevered thereabove so as to be in transverse alignment, the fixed bracket 104 of a brace linkage 106 is shimmed fast to the adjacent main frame 10 of the crawler in proper projecting relation to the vertical plane of the track frame. By way of completing the brace linkage, a self-aligning link 108 is pivotally connected to the bracket 104 and extends laterally to a horizontal pivot connection made at the opposite end of the link 108 with an upstanding, suspension mounted bracket 110 which is welded to the top of the L-shaped casting 102. In its normal horizontal attitude as illustrated the transversely extending link 108 is perceptibly higher than the level of the likewise transversely extending shaft axis 82 (FIG. 3).

BOOM BRACKET—FIGS. 1, 3, 4

Transversely aligned with the fixed bracket 104 and with the heavy L-shaped casting 102, and made fast to the outside face of the latter, a laterally extending rear side boom pivot bracket 112 pivotally supports the A-frame rear leg 114 of the boom of the side crane. The resulting loading, reacting diagonally downwardly along the rear leg axis 116, always comes in at an angle offset to one degree or another relative to the track frame 14 depending upon the particular angularity of the axis 116 which is varied to suit the distance of overhang needed by the suspended crane for the work alongside.

It can be seen that any track frame rotation in the plane of FIG. 3 about the ball 90, due to the A frame offset or other forces, will immediately be resisted and overcome by the force of the mechanical couple produced by the vertically spaced apart brace linkage 106 and shaft 80 so as to maintain the rear end portion of the right track frame 14 always vertical.

The pivot anchor for the pivotally anchored recoil mechanism strut 40 is indicated at 118, fixedly mounted within the track frame tunnel 52 (FIG. 4).

SUSPENSION OPERATION—FIG. 5

The first connection to the respective left and right track roller frames 12 and 14 is a rigid one made at their front by the solid crossbar 74 which supports, and is secured by the pins 76 to the front of, the main crawler frame, not shown in this figure.

The second connection, to the rear portion of each of the frames 12 and 14, is by the stub-axle-carried ball 90 on the shaft 80 which supports the main crawler frame, not shown, at the rear. The shaft 80 has the schematic appearance of being continuous instead of, in actuality, being divided into separated half axles or half shafts.

Thirdly, carried from horizontal pivot points on the rear of the main frame, not shown, the links 108 of the brace linkage are pivotally connected to the tops of the rear end portions of the track frames 12 and 14. The three points, not in a line on either track frame, inherently define a plane and so keep themselves in coplanarity as here desired.

From standpoint of the forces of principal concern herein, the linkage joint of the brace links 108 will be protected by the rigid crossbar 74 from the horizontal toe-out and toe-in load from the front idlers, not shown, which the crossbar 74 readily handles alone. The linkage joint of the brace links 108 is spared by the shaft 80 from longitudinal loads in the track frame and from the vertically upward load of the track roller thereadjacent, not shown, which loads are always fully taken the shaft 80.

Twisting motion, of the rear end portions of the track frames out of their vertical plane, is handled by structurally overcoming the torsion in just the right way. Each link 108 because of being double pivoted at the ends is thus stress relieved by its horizontal pivots with respect both to the main frame, not shown, and to the top of the track frame concerned. Similarly, the shaft 80 is stress relieved at the opposite outer ends with the rear end of the track frames. So, the links 108 and the shaft 80 resist the twist of the rear end frame portions without introducing any residual torsional strain on themselves or locally into the track frames.

FIG. 5 is an exaggerated showing of jounce deflection of the ends of the shaft 80 during extremely uneven travel of the crawler. Because the left link 108, the shaft 80, and the right link 108 are self-aligning, they act together as freely movable parallelogram suspension linkages readily accommodating to relative jounce and rebound deflection of extremely limited amount of the crawler, not shown, relative to the track frames 12 and 14.

So while divorced from other loads, the brace link 108 connected to the left frame 12, for example, will exhibit its strength by acting in tension, accompanied by the end concerned of the pivot shaft 80 acting by like amount under compression, to resist counterclockwise rotation of the rear end portion of the frame 12 as viewed in FIG. 5. Or the brace link 108 acting equally well in compression against the frame 12 will in conjunction with the end concerned of the shaft 80 acting in tension resist clockwise turning of the rear end portion of the track frame 12 as viewed in FIG. 5. Hence the rear end portion in this example of the left track roller frame 12 will be guided always to stay in the vertical disposition desired. The right frame 14 will be identically guided.

That is to say as a guide linkage with high mechanical efficiency, the journal sections 78 of the shaft where it connects to the track frames freely pivot in a vertical plane relative to the frames with no consequent twist force exerted; similarly, the link elements 108 freely pivot in a vertical plane on a horizontal swing axis relative to the frames concerned with no consequent twist force in their connections thereto. And, according to the overriding objective, the critical rear end portion of neither track frame changes angularity in a plane transverse to that end portion.

It is evident from the symmetry of FIG. 5 that the sideboom 66, 114 for suitable overhang at the opposite side can equally well be pivoted to the track frame 12 at that opposite side. In either case, each track frame must be constrained to about the same extent because the "off" track frame in the usual way is fitted with pivoting counterweights, opposite to the offset weight of the side crane and its load so as to cancel side tilting effects from the latter. It will therefore be apparent my diagonal-brace-free suspension, though highly simplified, nevertheless renders the sideboom crawlers hereof a highly stable, mobile work platform for the side crane laying or handling of pipe, structural members, and the like.

Variations within the spirit and scope of the invention described are equally comprehended by the foregoing description.

What is claimed is:
1. Crawler having:
   a main frame (10);
   a laterally spaced apart pair of vertically disposed track frames (12, 14) at either side thereof; and
   means providing connections of the main frame to separate points on the track frames comprising a crossbar (74) providing rigid connections to forward ends of the track frames and shaft structure (80) providing journalled connections to the rear end portions and braces (108) providing pivot connections to the track frames at the top.
2. The crawler of claim 1, characterized by:
   the braces (108) also providing pivot connections to the main frame and providing their top pivot connections to the track frames on the rear end portion and cooperating thereat with the shaft (80) as it deflects to complete a parallelogram suspension linkage therewith in guiding each track frame to maintain its vertical disposition as described.
3. In a crawler having a main frame, and a laterally spaced pair of vertically disposed track frames at either side thereof, improved means providing connections of the main frame to separate mounting points on the respective track frames, comprising:
   a cross bar providing rigid mounting connections to the forward ends of the track frames;
   shaft structure including stress relieved mounting connections to the rear end portions of the track frames allowing slight deflections of the shaft structure without consequent twist force exerted in the rear end portions of the track frames; and
   braces having stress relieved mounting connections to both the main frame and to the top of the track frames so as to accommodate, without exerting a consequent twist force, deflections of the shaft structure while cooperating therewith as a guide linkage to prevent the rear end portions of the track frames from twisting out of the vertical plane.
4. The invention according to claim 3 wherein each of said shaft structures is connected to its respective track frame by a self-aligning spherical bearing assembly (86).
5. The invention according to claim 4 characterized by:
   each bearing assembly comprising a stub axle (84) carried at each end of the shaft structure;

a corresponding annular shoe (94) carried by each rear end portion of the track frames; and annular spherical bearing means (90) mounted on each stub axle and disposed for relative movement in the shoe concerned.

6. The invention according to claim 3, characterized by the stress relieved mounting means on each brace comprising pivots at both ends of the brace (108).

7. The invention according to claim 6, characterized by each pivot defining a horizontal swing axis whereby under the deflection as stated the brace (108) concerned achieves its movement as track guide link in a vertical plane.

8. The invention according to claim 6, further having a sideboom (66, 114) with connections to separate mounting points on at least one track frame, and further characterized by third mounting means (112) mounting the sideboom pivotally to one mounting point on the rear end portion of said one track frame below and slightly to the outside of the brace (108) pivotally connected as aforesaid to the top.

* * * * *